United States Patent [19]

Nazuka

[11] 4,047,609
[45] Sept. 13, 1977

[54] MAGNETIC ROLLER CONVEYOR

[75] Inventor: Iwao Nazuka, Tokyo, Japan

[73] Assignee: Bunri Kogyo Kabushiki Kaisha, Tokyo, Japan

[21] Appl. No.: 685,688

[22] Filed: May 12, 1976

[30] Foreign Application Priority Data

June 2, 1975 Japan ................................ 50-66303

[51] Int. Cl.² ............................................. B65G 17/46
[52] U.S. Cl. .................................. 198/690; 198/780; 271/193
[58] Field of Search ................... 198/690, 780, 805; 271/18.1, 18.2, 193, DIG. 3

[56] References Cited

U.S. PATENT DOCUMENTS

| | | | |
|---|---|---|---|
| 1,448,712 | 3/1923 | Pool | 198/690 |
| 2,376,866 | 5/1945 | Butler | 198/690 X |
| 2,448,514 | 9/1948 | Butler | 198/690 X |
| 2,881,901 | 4/1959 | Zimmer | 198/690 |
| 2,939,568 | 6/1960 | Israelson et al. | 198/690 |
| 2,957,569 | 10/1960 | Parke | 198/690 X |
| 3,209,912 | 10/1965 | Sloan | 198/690 X |
| 3,523,602 | 8/1970 | Mojden et al. | 198/690 X |
| 3,952,857 | 4/1976 | Nazuka | 198/690 X |

FOREIGN PATENT DOCUMENTS 36,518  6/1925  Denmark .................. 198/690

*Primary Examiner*—Evon C. Blunk
*Assistant Examiner*—Richard K. Thomson
*Attorney, Agent, or Firm*—Flynn & Frishauf

[57] ABSTRACT

A magnetic roller conveyor wherein a plurality of magnetic rollers are arranged in a row, each of which includes an outer drum and an inner drum disposed in the outer drum and having magnets mounted thereon. The outer drum is rotated while the inner drum is fixed, whereby objects are conveyed by making use of magnetic forces of the magnets. Each roller includes a dampingly magnetized segment mounted past the vertex of the roller, the force of the segment decreasing in the direction of travel to facilitate transfer to the adjacent roller.

13 Claims, 3 Drawing Figures

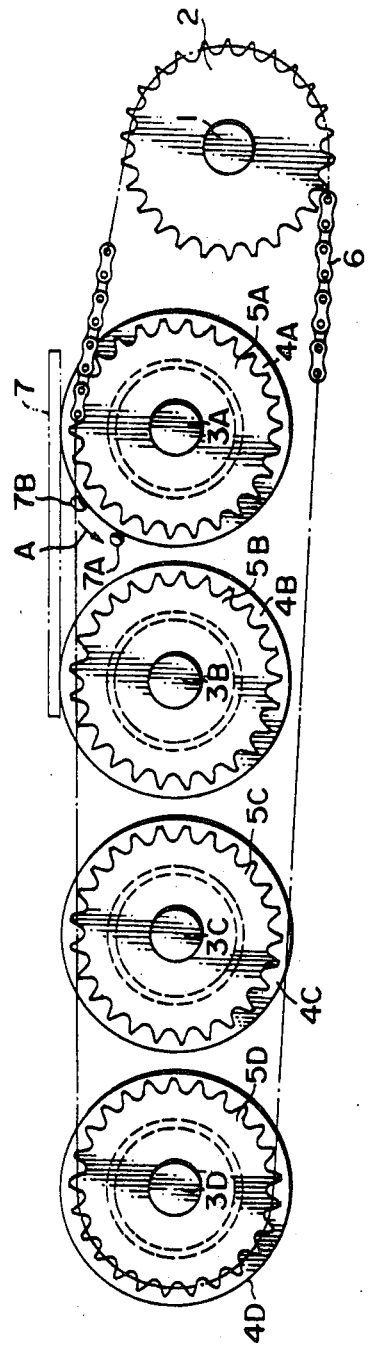
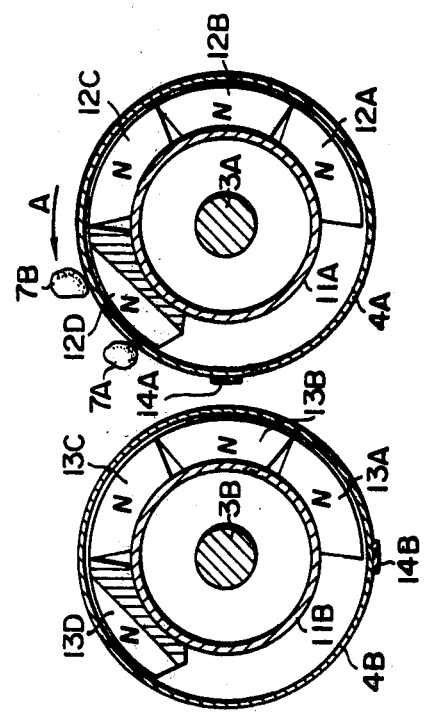

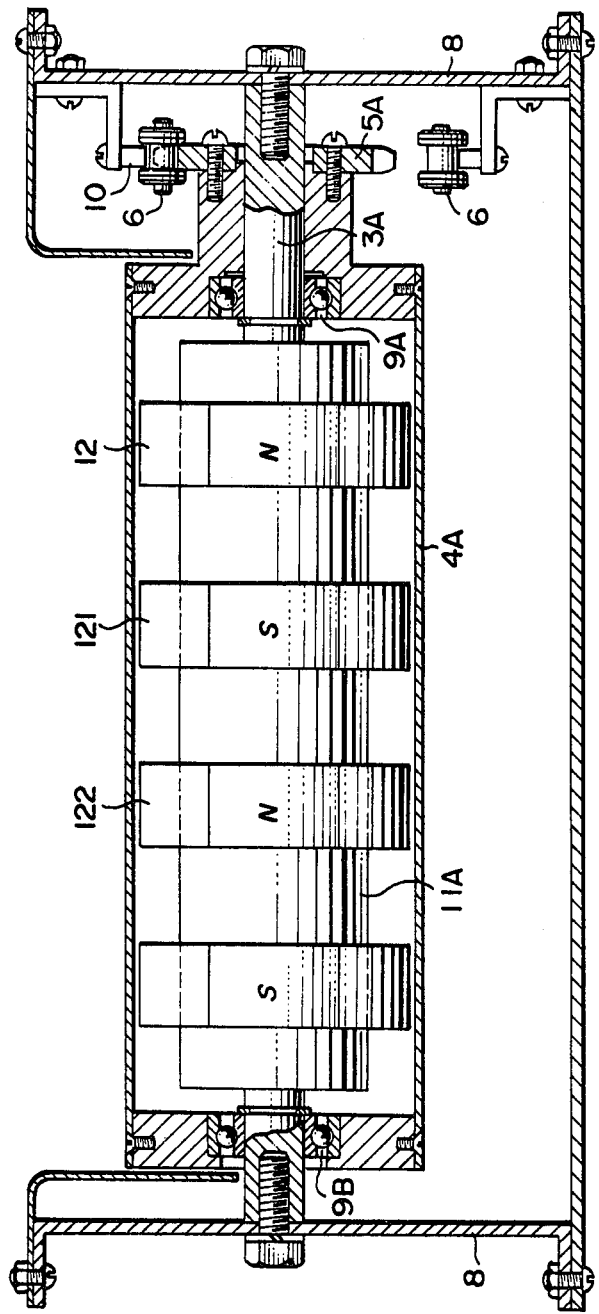

MAGNETIC ROLLER CONVEYOR

This invention relates to a roller conveyor for transporting objects. More particuarly, it relates to a magnetic roller conveyor in which an inner drum with magnets mounted thereon is disposed in an outer drum so as to transport objects by exploiting the magnetic forces of the magnets through the relative rotation between the outer and inner drums.

Many conveyor-type transportation devices, are presently known among the various transportation equipments, one in the case where an article to-be-conveyed is made of a magnetic substance, for example, a band plate transportation equipment in an iron mill or a chip disposal equipment of a metal working machine in a machine shop, has come to adopt a magnetic roller conveyor which takes advantage of the magnetic nature of the article to-be-conveyed. A feature of the known magnetic roller conveyor resides in that objects to-be-conveyed which have complicated and irregular shapes can be easily transported on a conveyance path, even an inclined conveyance path. A chip disposal equipment of a metal working machine in which this feature is the most notable will be explained below by way of example.

The disposal of chips from from a metal working machine, especially a cutting machine, has been noticed in recent years as being the most serious problem in rendering the operation of the machine automatic. Many automated working machines are therefore provided with conveyors for carrying the discharged chips out of the machines. It is required for the carrying-out conveyor that entangled chips and chips having irregular shapes can be transported and that the separation between the chips and a cutting oil used at the cutting is also enabled. The magnetic roller conveyor is most suited for these requirements. Owing to the feature previously stated, the chips can be easily transported, and the fall of the cutting oil, which is not magnetically influenced, due to its own weight is promoted by employing an inclined conveyance path, so that only the chips are taken out of the machine. The prior-art magnetic roller conveyor, however, has not been extensively adopted on account of a disadvantage ascribable to its construction. More specifically, the known magnetic roller conveyor is so constructed that magnets mounted on rotatable rollers arranged at fixed intervals rotate along with the rollers and that the object to-be-conveyed is delivered in the direction of rotation of the attractive force of the magnets, thereby to let the object pass on the respective rollers successively. Fine chips, however, pass through the interspace between the adjacent rollers, so that they are not transferred between the rollers and that they merely conduct a rotational motion while being kept magnetically drawn to the outer peripheral surface of one roller. This problem is not peculiar to the chip disposal equipment of a metal working machine mentioned herein, but it may be said to be always involved in conveyors which are required to be general-purpose.

It is accordingly an object of this invention to provide a magnetic roller conveyor which not only causes no inconvenience to the transportation of long objects and large objects, but also enables the transportation of comparatively small objects or fine objects.

A further object of this invention is to provide a magnetic roller conveyor which can transport even objects of an extremely low rigidity.

Another object of this invention is to provide a magnetic roller conveyor which can transport objects of special shapes or complicated shapes.

SUMMARY OF THE INVENTION

In accordance with the present invention, a magnetic roller for transporting objects comprises a plurality of magnetic rollers arranged in a row in the transport direction of the roller conveyor. Each of the magnetic rollers includes a rotatable conveying roller and a fixed inner barrel disposed within the rotatable conveying roller. Each of the inner barrels has at least one magnet means mounted on its outer periphery and over substantially half of its respective circumference.

In a preferred embodiments, the magnet means each comprises a plurality of adjacent magnet pieces on the outer periphery of the inner barrel. In a still further preferred arrangement, each of the inner barrels has a plurality of the magnet means spaced along the axial length thereof, and alternate ones of the spaced magnetic means have N and S polarities.

In accordance with a further feature, the end portion of each of the magnet means comprises a dampingly magnetized magnet whose magnetic force decreases gradually in the direction of rotation of the conveying roller. This enables objects to be conveyed and which are attracted to the outer surface of the conveying roller to jump to the next successive conveying roller due to the increased magnetic force exerted by the magnets of the next successive conveying roller.

Other objects and advantages of the invention will become apparent from the following discussion of the accompanying drawings.

BRIEF DESCRIPTION OF THE DRAWINGS

FIG. 1 is a general side view which schematically shows an embodiment of a magnetic roller conveyor according to this invention, FIG. 2 is a cross-sectional view, partially broken away, of one of conveying rollers in the embodiment, and FIG. 3 is a transverse sectional view of the conveying rollers.

DETAILED DESCRIPTION

Referring to FIG. 1, a prime motion rotary shaft 1 interlocks with an output shaft of a motor (not shown). A chain sprocket 2 is fixed to the prime motion rotary shaft 1 and is rotated therewith. Symbols 3A, 3B, 3C and 3D indicate rotation supporting shafts of conveying rollers 4A, 4B, 4C and 4D, respectively. The respective conveying rollers 4A – 4D are provided with chain sprockets 5A, 5B, 5C and 5D, and they are rotated in interlocking relationship with the prime motion rotary shaft 1 by means of a roller chain 6 which engages with the chain sprockets 2 and 5A – 5D. An object to-be-conveyed 7 is transported on the conveying rollers 4A – 4D.

FIG. 2 is a cross-sectional view taken along the rotation supporting shaft in one of the conveying rollers 4A, 4B, 4C and 4D described with reference to FIG. 1. FIG. 2 for reference purposes illustrates a cross-sectional view along shaft 3A. The rotation supporting shaft 3A briefly explained above is fixed to a frame 8 of the conveyor by bolts. Bearings 9A and 9B are snugly fitted on the rotation supporting shaft 3A with their inner races fixed thereto. The conveying roller 4A which is supported on outer races of the bearings 9A and 9B can freely rotate around the rotation supporting shaft 3A. The conveying roller 4A has the chain sprocket 5A fixed thereto, with which the roller chain 6 is engaged to transmit the rotation of the prime motion rotary shaft 1 thereto. In order to satisfactorily engage with the chain sprockets 5A – 5D, the roller chain 6 is held down by an elongate keep plate 10 which extends in the moving direction of the roller chain 6. As illustrated in FIG. 2, the conveying roller 4A is in the shape of a hollow cylinder. Disposed in the interior of the hollow cylinder is an inner barrel of a magnetic substance 11A which is fixed to the rotation supporting shaft 3A by welding. The inner barrel 11A is provided with magnet pieces 12, 121, 122, etc., along its outer circumference.

FIG. 3 shows a transverse section of the conveying rollers 4A, 4B 4C or 4D, but is described with reference to roller 4A of FIG. 2. On the outer periphery of the inner barrel 11A fixed to the rotation supporting shaft 3A, the magnet pieces 12A, 12B, 12C and 12D are boned along the circumferential direction and over approximately half of the circumference of the inner barrel 11A. The polarities of the magnet pieces 12A – 12D are identical as viewed in the radial direction of the inner barrel 11A. Assuming now that the conveying roller 4A rotates in the direction of the arrow A in FIG. 3, a dampingly magnetized magnet which is arranged so that its magnetic force reduces in the direction of rotation is used as the magnet piece 12D which is situated at an end of the magnet pieces in the direction of rotation of roller 4A. Likewise, the conveying roller 4B next to roller 4A in the rotational direction thereof, has the magnet pieces 13A, 13B, 13C and 13D bonded along the outer peripheral surface of the inner barrel 11B. The respective conveying rollers 4A – 4D have protuberant pieces (pieces 14A and 14B are seen in FIG. 3) bonded and fixed thereto, the protuberant pieces extending in the axial direction of the conveying rollers.

Regarding the array of the magnet pieces to be attached to the outer peripheral surface of the inner barrel, various arrangements may be used. The best arrangement can be properly adopted in dependence on the article to-be-conveyed. In the embodiment as shown in FIG. 2, the magnet array 12 at the right end has N polarity, the adjacent magnet array 121 has S polarity, the next magnet array 122 has N polarity, and so forth.

Description will now be made of the operation of the magnetic roller conveyor having such construction as described above. With the rotation of the conveying rollers 4A – 4D, the object to-be-conveyed 7 attracted by the magnetic force is successively fed in the direction of rotation. A case where the object to-be-conveyed is small will now be described in detail. As illustrated in FIG. 3, the objects, e.g., chips 7A and 7B from a metal working machine, attracted on the outer peripheral surface of the conveying roller 4A by the magnetic force move in the direction of the arrow A as the conveyor roller 4A rotates. When the rotation proceeds and the chips come close to the conveying roller 4B, the magnetic force of the dampingly magnetized magnet 12D, which acts to draw the chips onto the outer peripheral surface of the conveying roller 4A, decreases gradually, whereas the magnetic force of the magnet piece 13B to draw the chips onto the outer peripheral surface of the conveying roller 4B becomes gradually more influential. At the time when the relative strengths of the forces are reversed, the chips 7A and 7B leave the conveying roller 4A and jump to the conveying roller 4B. With the magnetic roller conveyor of the rotating magnet type of the prior art, the reversal of the relative magnetic forces is impossible. As previously stated, therefore, in the prior art the jump of the chips 7A and 7B does not take place and the conveyance of the chips is not properly executed. In contrast, with the conveyor of the fixed magnet type according to this invention, the jump of the chips is easily conducted without causing any inconvenience.

In a case where a comparatively long article of a complicated shape is to be transported, the transportation sometimes becomes impossible on account of the entanglement of the succeeding object to-be-conveyed with the preceding one. At this time, as the conveying rollers 4A – 4D rotate, the protuberant pieces 14A – 14D provided thereon push up the objects to-be-conveyed forcibly and define a clearance between the objects and the outer peripheral surfaces. Then, the transportation is facilitated owing to the quick loss of the balance between the magnetic forces and to the mechanical force of pushing the objects in the conveying direction.

As is apparent from the above explanation, the magnetic roller conveyor according to this invention has various advantages as listed below.
1. The merits of the prior-art magnetic roller conveyor, i.e., the steep slope transportation, the transportation in a liquid, the separation of different substances as exploits their magnetic properties, etc., are retained.
2. No inexpedience is brought about in the transportations of long objects and large objects, and yet, the transportation of comparatively small objects or fine objects, which has hitherto been impossible, is enabled.
3. Even objects of an extremely low rigidity can be conveyed.
4. Objects of a special shape or complicated shape can be conveyed owing to the protrusions disposed on the outer peripheries of the conveying rollers.

What we claim is:
1. A magnetic roller conveyor for transporting objects, comprising a plurality of magnetic rollers arranged in a row in the transport direction of the roller conveyor, each of said magnetic rollers including:
   a rotatable conveying roller,
   a fixed inner barrel disposed within said rotatable conveying roller, and
   magnet means on the outer periphery of said fixed inner barrel and extending over substantially half of the circumference of said fixed inner inner barrel and extending over the vertex of said fixed inner barrel,
   a last part of said magnet means which is past the vertex of said fixed inner barrel in the direction of rotation of said conveying roller comprising a dampingly magnetized portion whose magnetic force decreases, relative to the magnetic force of the remaining portion of said magnet means, gradually in said direction of rotation of said conveying roller, said last part of said magnet means being adjacent a strong magnetic force portion of the magnet means of the next successive one of said plurality of magnetic rollers which has a stronger magnetic force than that of said dampingly magnetized portion.

2. The magnetic roller conveyor as defined in claim 1, comprising at least one protuberant piece on an outer peripheral surface portion of each of conveying rollers and extending in an axial direction of each of said conveying rollers.

3. The magnetic roller conveyor as defined in claim 1, wherein said magnet means comprises a plurality of adjacent magnet pieces on the outer periphery of said inner barrel.

4. The magnetic roller conveyor as defined in claim 3, wherein said adjacent magnetic pieces of each respective magnetic means are immediately adjacent and contacting each other.

5. The magnetic roller conveyor as defined in claim 3, wherein one of said magnet pieces on said outer periphery of said inner barrel which is situated at a last part of said magnet means in the direction of rotation of said conveying roller is a dampingly magnetized magnet whose magnetic force decreases gradually in said direction of rotation of said conveying roller.

6. The magnetic roller conveyor as defined in claim 5, wherein said last part of said magnetic means is adjacent the next successive one of said plurality of magnetic rollers.

7. The magnetic roller conveyor as defined in claim 3, comprising, on each of said inner barrels, a plurality of said magnet means spaced along the axial length thereof.

8. The magnetic roller conveyor as defined in claim 7, wherein alternate ones of said magnet means of each of said inner barrels are N and S polarities.

9. The magnetic roller conveyor as defined in claim 1, comprising, on each of said inner barrels, a plurality of said magnet means spaced along the axial length thereof.

10. The magnetic roller conveyor as defined in claim 9, wherein alternate ones of said magnet means of each of said inner barrels are N and S polarities.

11. The magnetic roller conveyor as defined in claim 1, comprising means for rotating said conveying rollers.

12. The magnetic roller conveyor as defined in claim 11, wherein said rotating means includes means for rotating said rollers in interlocking rotational relationship.

13. The magnetic roller conveyor as defined in claim 1 wherein said last part of said magnet means being adjacent the portion of said magnetic means of said next successive magnetic roller having the strongest magnetic force.

* * * * *